June 20, 1933.  W. PUESCHEL  1,914,979

RIVETING MECHANISM

Filed March 21, 1931

INVENTOR.
WILLIAM PUESCHEL
BY
*Jn. W. McConkey*
ATTORNEY

Patented June 20, 1933

1,914,979

UNITED STATES PATENT OFFICE

WILLIAM PUESCHEL, OF SOUTH BEND, INDIANA, ASSIGNOR TO BENDIX BRAKE COMPANY, OF SOUTH BEND, INDIANA, A CORPORATION OF ILLINOIS

RIVETING MECHANISM

Application filed March 21, 1931. Serial No. 524,233.

This invention relates to machines for riveting and the like, and is illustrated as embodied in a machine for riveting brake lining to brake shoes. An object of the invention is to arrange the head of the machine to shift its position slightly and yieldingly, to accommodate itself to the work, thereby minimizing cracked linings and improperly secured rivets.

Various features of the invention relate to the arrangement of the springs and stops, and the novel pivot member, by the use of which the head of the machine is mounted in the desired manner on its base. These and other specific desirable constructions and arrangements will be apparent from the following description of the illustrative embodiment shown in the accompanying drawing, in which.

Figure 1:
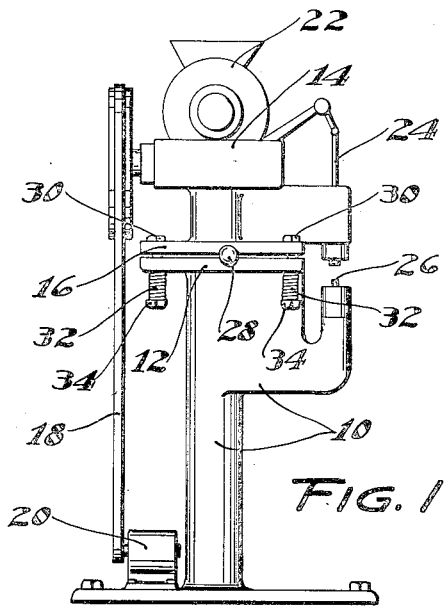
Figure 1 is a side elevation of the machine.
Figure 3:
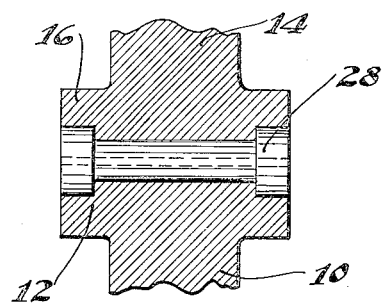
Figure 3 is a partial section, on the line 3—3 of Figure 2, showing the mounting of the pivot member between the head and the base.
Figure 2:
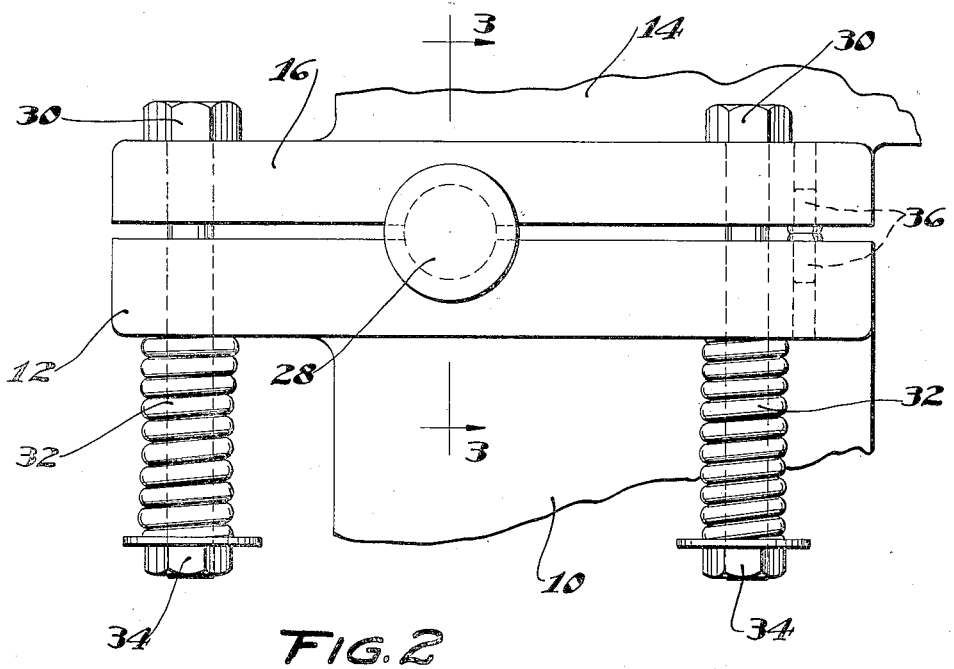
Figure 2 is a side elevation, on a larger scale than Figure 1, showing the joint between the head and base.

The machine illustrated, and which is intended for riveting brake linings to brake shoes, includes a suitable base 10, having a flanged plane top portion 12, and a head 14 having a corresponding flanged plane bottom portion 16.

The head 14 carries the usual mechanism (not shown in detail), driven by a belt 18 from a motor 20, for operating feed mechanism including a rivet hopper 22, and a riveting plunger 24 cooperating with an anvil 26 or the like carried by the base 10.

According to the present invention, there is arranged between portions 12 and 16 a novel pivot member 28 seated in transverse sockets formed in said portions, and having shoulders or enlargements at its ends which prevent the head from twisting on the base.

Yielding means is provided for urging portions 12 and 16 toward each other. Preferably this means includes four bolts or the like 30, one at each corner, passing through alined openings, somewhat larger than the bolts, formed in portions 12 and 16. Springs 32 are sleeved on the bolts and held under compression by nuts 34 threaded on the bolts.

The normal position of the head is determined by means such as pairs of stops 36, shown as having heads engaging each other and having shanks seated in sockets in portions 12 and 16 respectively.

While one illustrative embodiment has been described in detail, it is not my intention to limit the scope of the invention to that particular embodiment, or otherwise than by the terms of the appended claims.

I claim:

1. A machine comprising a base, a head, a transverse pivot member between the base and head and which is provided with shoulders at its ends preventing twisting of the head on the base, and springs yieldingly holding said head in position while permitting it to rock about said member when necessary.

2. A riveting machine or the like comprising a base and a head having opposed grooves, a pivot member seated in said grooves and provided with shoulders at its ends preventing twisting of the head on the base, and yielding means holding the head in its normal operative position while permitting it to rock about the pivot under stresses developed in the operation of the machine.

In testimony whereof, I have hereunto signed my name.

WILLIAM PUESCHEL.